(12) United States Patent
McCloskey

(10) Patent No.: US 6,910,586 B2
(45) Date of Patent: Jun. 28, 2005

(54) SYSTEM AND METHOD FOR FOLDING CONVEYORS

(76) Inventor: James Paschal McCloskey, 78 Cawkers Cove Road, Port Perry, Ontario (CA), L9L 1R6

( * ) Notice: Subject to any disclaimer, the term of this patent is extended or adjusted under 35 U.S.C. 154(b) by 124 days.

(21) Appl. No.: 10/390,749

(22) Filed: Mar. 19, 2003

(65) Prior Publication Data

US 2004/0182758 A1 Sep. 23, 2004

(51) Int. Cl.[7] .............................................. B07B 1/49
(52) U.S. Cl. ...................... 209/241; 209/420; 209/288; 198/313; 198/632
(58) Field of Search ................................ 209/241, 420, 209/421, 284, 288, 293, 294; 198/313, 632, 312, 315, 316.1, 317, 318

(56) References Cited

U.S. PATENT DOCUMENTS

| | | | | |
|---|---|---|---|---|
| 2,734,730 A | * | 2/1956 | Talboys ........................ | 171/16 |
| 3,825,107 A | * | 7/1974 | Cary et al. .................. | 198/313 |
| 4,303,506 A | | 12/1981 | Finlay | |
| 4,396,110 A | * | 8/1983 | Christensen ................ | 198/576 |
| 4,624,357 A | | 11/1986 | Oury et al. | |
| 4,879,023 A | | 11/1989 | Mallaghan | |
| 4,927,528 A | | 5/1990 | Doppstadt | |
| 4,983,280 A | | 1/1991 | Eriksson | |
| 5,178,253 A | * | 1/1993 | Fix ............................. | 198/317 |
| 5,819,950 A | | 10/1998 | McCloskey | |
| 6,006,921 A | | 12/1999 | Zehr | |
| 6,095,320 A | * | 8/2000 | DeMong et al. ............. | 198/812 |
| 6,543,622 B1 | * | 4/2003 | Fridman ..................... | 209/421 |

FOREIGN PATENT DOCUMENTS

| | | | | |
|---|---|---|---|---|
| CH | 674197 A5 | * | 5/1990 | ........... B65G/15/26 |
| GB | 2200613 A | * | 8/1988 | ........... B65G/21/10 |

* cited by examiner

*Primary Examiner*—Donald P. Walsh
*Assistant Examiner*—Joseph C Rodriguez
(74) *Attorney, Agent, or Firm*—Bereskin & Parr

(57) ABSTRACT

A hydraulic ram assembly adapted to move parts of a conveyor between a number of pre-defined positions. In one embodiment of the invention, the hydraulic ram assembly consists of a single hydraulic ram, pivotally coupled at one end to the chassis of a trommel, and pivotally coupled at the other end to at least one of a number of mechanical linkages. The mechanical linkages are configured to link the hydraulic ram and at least two parts of a trommel conveyor. At least one mechanical linkage is lockable and unlockable such that in operation, the hydraulic ram can move the parts of the trommel conveyor between (a) a first, lowered, extended, operational position; (b) a second, raised, extended, operational position; and (c) a third, folded, retracted position, suitable for transportation.

15 Claims, 7 Drawing Sheets

SYSTEM AND METHOD FOR FOLDING CONVEYORS

FIELD OF THE INVENTION

This invention relates generally to trommel equipment, and more particularly, to conveyors of portable trommels.

BACKGROUND OF THE INVENTION

Trommel equipment is widely used for sorting material by size in various industries including construction, waste disposal, landscaping, and building demolition. It is also used by aggregate producers. Trommel screens are typically cylindrical in shape, open at both ends, and are rotated while in use. A trommel screen is also typically inclined, so that material naturally tends to travel from the higher end to the lower end. The material to be processed is dumped into the higher end of a trommel screen and rotation causes the material to tumble towards the lower end. Some of the material (i.e. the "fines") falls down through the trommel screen. The balance, being generally coarse material, is discharged out the lower end.

Conventional portable trommel equipment typically comprises a rotary trommel, an input conveyor, and a fines conveyor. These are mounted together on a chassis, which is typically provided with wheels at one end and a "fifth wheel" at the other, for connection to a conventional tractor unit. The input conveyor serves to feed the trommel with materials that are deposited on it. The fines conveyor collects screened material (i.e. the fines) falling through the trommel screen, and can extend the length of the machine from underneath the trommel to a discharge end.

One example of a portable trommel is described in U.S. Pat. No. 5,819,950. This patent describes a portable trommel having a stockpiling conveyor mounted on the chassis. The stockpiling conveyor comprises a lower end adapted to receive screened material from the fines conveyor and an upper end for discharging screened material to form a stockpile. The stockpiling conveyor can have two parts, which are moveable between a first, extended, operational position, and a second, retracted position for transportation. Accordingly, a "folding" of the stockpiling conveyor is effected when the two parts thereof are moved into the retracted position, which may enable the portable trommel to be transported more readily on ordinary roads.

In one embodiment of the invention described in U.S. Pat. No. 5,819,950, the portable trommel is equipped with activation means adapted to displace the two parts of a stockpiling conveyor between the operational and retracted positions. In this embodiment, the activation means comprises a pair of hydraulic pistons and cylinder assemblies, and a corresponding pair of mechanical linkages on either side of the stockpiling conveyor.

SUMMARY OF THE INVENTION

The present invention is generally directed to an improvement to the activation means used in portable trommels to move parts of a conveyor between a number of pre-defined positions. In accordance with the present invention, an activation means comprising a hydraulic ram assembly coupled to one or more mechanical linkages that co-operate to move at least two parts of a trommel conveyor between the pre-defined positions is provided.

In one aspect of the present invention, there is provided a portable trommel comprising: a chassis, including support wheels at one end thereof for movement of the portable trommel; a trommel rotatably mounted on the chassis and having a input end, an output end, and a trommel screen; input means for supplying material to be screened to the input end of the trommel, the input means being mounted on the chassis adjacent the input end of the trommel; output means for collecting material passing through the trommel screen, the output means being mounted on the chassis below the trommel; a stockpiling conveyor mounted on the chassis and having a lower end for receiving screened material from the output means and having an upper end for discharging screened material to form a stockpile, wherein the stockpiling conveyor comprises a lower part pivotally attached to the chassis and an upper part pivotally attached to the lower part, the lower and upper parts being movable between an extended position in which the stockpiling conveyor extends upwardly and outwardly from the chassis, and a retracted position for transportation in which the lower part is at an angle to the upper part, one or more mechanical linkages connecting the lower and upper parts of the stockpiling conveyor; a first locking means to prevent relative movement between the lower and upper parts; a second locking means for locking the lower part of the stockpiling conveyor in a selected position; and a hydraulic ram assembly mounted between the chassis and the one or more mechanical linkages, wherein at least one of the one or more mechanical linkages can be locked using the first locking means, whereby activation of the hydraulic ram assembly displaces the lower and upper parts together, and wherein the at least one mechanical linkage can be unlocked to permit relative movement between the lower and upper parts, whereby, with the lower part locked in the selected position by the second locking means, activation of the hydraulic ram displaces the upper part of the stockpiling conveyor relative to the lower part.

In another aspect of the invention, there is provided a portable trommel comprising: a chassis, including support wheels at one end thereof for movement of the portable trommel; a trommel rotatably mounted on the chassis and having an input end, an output end, and a trommel screen; input means for supplying material to be screened to the input end of the trommel, the input means being mounted on the chassis adjacent the input end of the trommel; output means for collecting material passing through the trommel screen, the output means being mounted on the chassis, below the trommel; a stockpiling conveyor coupled to the chassis and having a lower end for receiving screened material from the output means and having an upper end for discharging screened material to form a stockpile; a rejected material conveyor coupled to the chassis and extending from the output end of the trommel for removal of course material that has traveled through the trommel, wherein the rejected material conveyor comprises a lower part pivotally attached to the chassis and an upper part pivotally attached to the lower part, the lower and upper parts being movable between an extended position in which the rejected material conveyor extends upwardly and outwardly from the chassis, and a retracted position for transportation in which the lower part is at an angle to the upper part; one or more mechanical linkages connecting the lower and upper parts of the rejected material conveyor; a first locking means to prevent relative movement between the lower and upper parts; a second locking means for locking the lower part of the rejected material conveyor in a selected position; and a hydraulic ram assembly mounted between the chassis and the one or more mechanical linkages, wherein at least one of the one or more mechanical linkages can be locked using the first locking means, whereby activation of the hydraulic ram assembly displaces the lower and upper parts together, and wherein the at least one mechanical linkage can be unlocked to permit relative movement between the lower and upper parts, whereby, with the lower part locked in the selected position by the second locking means, activation of the hydraulic ram displaces the upper part of the rejected material conveyor relative to the lower part.

In another aspect of the present invention, there is provided a conveyor having a lower end for receiving material to be conveyed and an upper end for discharging material to form a stockpile, wherein the conveyor comprises: a lower part pivotally attached to the chassis; an upper part pivotally attached to the lower part, wherein the lower and upper parts are movable between an extended position in which the conveyor extends upwardly and outwardly from the chassis, and a retracted position for transportation in which the lower part is at an angle to the upper part; one or more mechanical linkages connecting the lower and upper parts of the conveyor; a first locking means to prevent relative movement between the lower and upper parts; a second locking means for locking the lower part of the conveyor in a selected position; and a hydraulic ram assembly mounted between the chassis and the one or more mechanical linkages, wherein at least one of the one or more mechanical linkages can be locked using the first locking means, whereby activation of the hydraulic ram assembly displaces the lower and upper parts together, and wherein the at least one mechanical linkage can be unlocked to permit relative movement between the lower and upper parts, whereby, with the lower part locked in the selected position by the second locking means, activation of the hydraulic ram displaces the upper part of the conveyor relative to the lower part.

BRIEF DESCRIPTION OF THE DRAWINGS

For a better understanding of the present invention, and to show more clearly how it may be carried into effect, reference will now be made, by way of example, to the accompanying drawings wherein.

DETAILED DESCRIPTION OF THE INVENTION

The present invention is generally directed to a new activation means primarily for use in portable trommels, adapted to move parts of a conveyor between a number of pre-defined positions. In accordance with the present invention, an activation means is provided comprising a hydraulic ram assembly coupled to one or more mechanical linkages that co-operate to move at least two parts of a trommel conveyor between the pre-defined positions. The present invention may be adapted for use in portable trommels such as that which is generally described in U.S. Pat. No. 5,819,950 for example, the contents of which are hereby incorporated by reference.

In one embodiment of the invention, the hydraulic ram assembly consists of a single hydraulic ram pivotally coupled at one end to the chassis of a trommel, and pivotally coupled at the other end to at least one of a number of mechanical linkages. The mechanical linkages are configured to link the hydraulic ram and at least two parts of a trommel conveyor, such that in operation, the hydraulic ram can move the parts of the trommel conveyor between (a) a first, lowered, extended, operational position; (b) a second, raised, extended, operational position; and (c) a third, folded, retracted position, suitable for transportation.

The use of a hydraulic ram assembly as activation means for moving parts of a trommel conveyor, and in particular, the use of a single hydraulic ram makes this activation means simpler, easier and more economical to manufacture and to maintain. Support chains used in some prior art assemblies to support the conveyor are not required. Furthermore, the folding of the conveyor may be performed using a remote control system that is also used in to raise and lower the conveyor. Only one ram is needed in this assembly where multiple rams may have been required in other assemblies used to fold conveyors. Still further since the hydraulic ram assembly may be housed beneath the conveyor and adjacent to the chassis of the portable trommel, it is less likely to be damaged.

Figure 1:
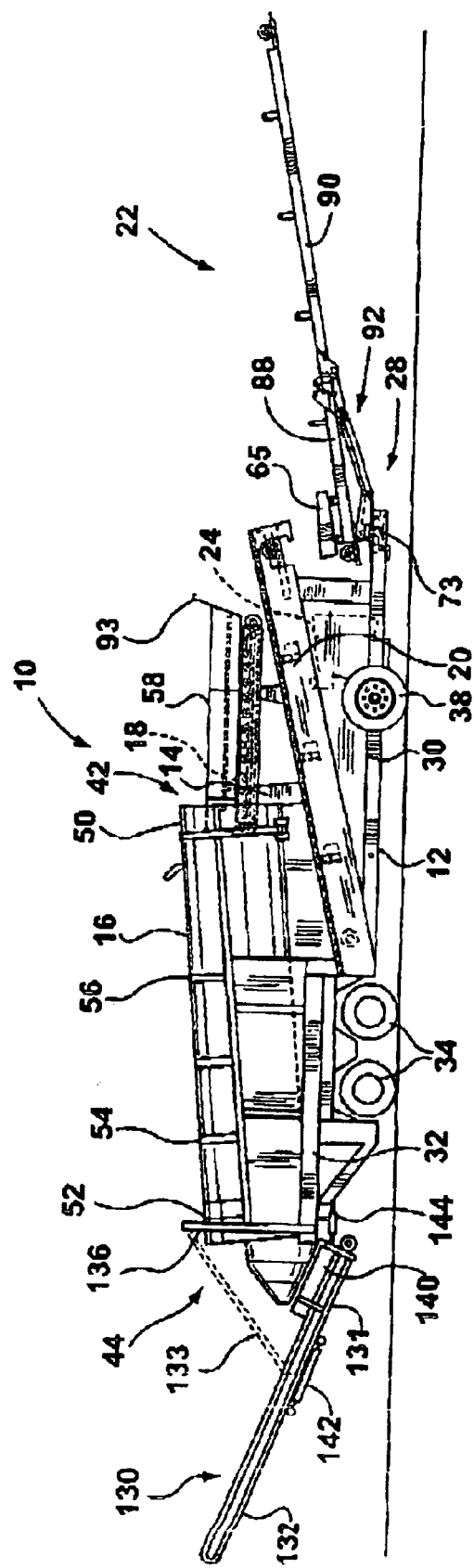
FIG. 1 is a side view of a portable trommel in an embodiment of the present invention.

Referring to FIG. 1, a side view of a portable trommel in an embodiment of the present invention is illustrated and shown generally as 10. Trommel 10 comprises a chassis 12, a body 14, a rotary trommel cylinder 16, an input conveyor 18, an output or fines conveyor 20, a retractable stockpiling conveyor 22, an engine compartment 24, and a control unit (not shown).

Chassis 12 has a front portion 28, a mid-portion 30, and a discharging or rear portion 32. Fixed wheels 34 are located under the rear portion 32 of chassis 12. Rear portion 32 has separate side frame elements that extend from and lie on top of the side frame elements for the front and mid-portions 28, 30 of chassis 12. A set of hydraulic landing wheels 38 is located under the front portion of chassis 12.

Body 14 is mounted on chassis 12. Body 14 supports rotary trommel cylinder 16 and houses engine compartment 24. Body 14 comprises a generally rectangular framework with a plurality of upright frame members and top members. The upright frame members are spaced along chassis 12, and the top members may include front overhanging members positioned over the front portion 28 of chassis 12, members positioned over engine compartment 24, and members positioned over input conveyor 18 and rotary trommel cylinder 16. Engine covering screens are provided to house engine compartment 24 and are secured between four upright frame members and top members. The frame of body 14 is fabricated from structural tubing and is of all welded construction with the necessary bracing.

Rotary trommel cylinder 16 comprises an open feed end 42, an open discharge end 44, and an outer peripheral framework housing a cylindrical trommel screen cage [not shown], all of which is tilted at an appropriate angle such that the open feed end 42 is raised above the open discharge end 44. The outer peripheral framework comprises an inlet ring 50 and discharge ring 52 of thick steel plate, as well as two circular reinforcing rings 54 and 56 which bolt and clamp trommel screen cloth to the outside of the trommel screen cage. The trommel screen cloth is high-strength crimped and inter-woven screen cloth of generous gauge, such that apertures are appropriately sized for the material to be screened. Structural longitudinal angle members [not shown] extend parallel to the axis on the interior of rotary trommel cylinder 16 to promote tumbling of material. Freely rotating nylon bristle brushes [not shown] are mounted in known manner in close proximity to the top of rotary trommel cylinder 16 to engage the outside of the trommel screen cage and clothed area for cleaning purposes. Each brush is manually adjustable relative to the cloth face.

Rotary trommel cylinder 16 is supported and retained in position by four support rollers and one thrust roller [not shown]. The trommel rollers are supported from welded brackets on chassis 12. A fully enclosed chute [not shown] embraces the lower half of rotary trommel cylinder 16 and directs processed materials onto fines conveyor 20. The chute has inclined surfaces made from conventional industrial sheeting with a low co-efficient of friction to lessen material build up. A drive means for rotating the trommel screen cage is connected to a heavy plate sprocket [not shown] fixed to inlet ring 50. The drive means principally comprises a hydraulic motor, a smaller drive sprocket and a roller chain. The plate sprocket is driven by means of the roller chain and from the smaller drive sprocket powered by the drum hydraulic motor. The hydraulic motor is conventional and is connected via hydraulic lines to the control unit. The hydraulic motor is mounted on a mounting plate [not shown], which is welded or otherwise secured to the body 14. An adjustable control valve in the control unit provides a variable speed range for the rotation of the trommel screen cage.

Input conveyor 18 forms the base of a feed hopper 58, which is fabricated from four steel plates. Input conveyor 18 is conventional, comprises a belt that is vulcanized in place, and is mounted to chassis 12 in known manner. Input conveyor 18 is driven by way of a hydraulic motor [not shown] that is connected to the control unit. In known manner, belt support rollers support the belt of input conveyor 18 and side guide idlers fitted to this belt assist in maintaining true belt alignment. Input conveyor 18 has 4" diameter steel support rollers spaced at 1' centers, and the drive pulley is lagged (i.e. provided with a rubber cover). The tail pulley is of wing type, with manual, protected screw take-up adjustment. The belt of input conveyor 18 is 36" wide.

Fines conveyor 20 is located under rotary trommel cylinder 16 and is also conventional in structure. Fines conveyor 20 comprises a belt that is vulcanized in place and is mounted to chassis 12 and body 14 in known manner. An angle frame supports closely spaced standard troughed idlers. Fines conveyor 20 is positioned such that it collects all materials passing through rotary trommel cylinder 16. A closely coupled hydraulic motor [not shown] drives the drive pulley for fines conveyor 20, and a pivoting neoprene rubber belt cleaner is installed under the drive pulley. The length of fines conveyor 20 is intentionally shorter and its slope rises at a lower rate than conventional fines conveyors. Fines conveyor 20 is inclined at an angle so as to be generally parallel to the axis of rotary trommel cylinder 16. Conventional conveyors are typically longer and inclined at a greater angle to provide some ability to form a stockpile. Fines conveyor 20, however, is sufficiently short and positioned for proper integration with stockpiling conveyor 22. To accommodate the width of the rotary trommel cylinder 16, fines conveyor 20 has a 42" wide belt and 4" diameter standard troughed idlers in one implementation of trommel 10. The drive pulley is lagged, and the tail pulley is of wing type with protected screw take-up adjustment.

Stockpiling conveyor 22 is positioned underneath fines conveyor 20 so that material from fines conveyor 20 is deposited on the stockpiling conveyor. Stockpiling conveyor 22 is equipped with a chute 65 attached to the frame of stockpiling conveyor 22 to aid in receiving materials deposited by fines conveyor 20. The belt for stockpiling conveyor 22 is a 30' belt, and stockpiling conveyor 22 has an angle frame, in one implementation of trommel 10. The belt is supported on 4' diameter standard troughed idlers. The drive pulley for stockpiling conveyor 22 is lagged and driven by a hydraulic motor. The tail pulley is of wing type with protective screw take-up adjustment. A pivoting neoprene rubber belt cleaner is provided under the drive pulley.

Stockpiling conveyor 22 may be adapted for rotation about a vertical axis to provide increased stockpiling ability. For example, stockpiling conveyor 22 may be coupled to a rotation actuation means 73 adapted for this purpose. In one implementation of trommel 10, rotation actuation means 73 comprises a first turntable plate rotatably mounted on a second, supporting turntable plate fixed to chassis 12, to facilitate rotation of stockpiling conveyor 22 about a vertical axis.

Stockpiling conveyor 22 is also capable of variable inclination by rotation about a horizontal axis, and can be folded or collapsed for transportation. Stockpiling conveyor 22 comprises a first, lower part 88 and a second, upper part 90 pivotally attached to one another, so that stockpiling conveyor 22 can be retracted into a folded position for transportation. In accordance with the present invention, a folding mechanism comprising a hydraulic ram assembly 92 as an actuation means is provided, that will be described in further detail below with reference to FIGS. 2A through 3C.

Body 14 of trommel 10 may also include one or more support structures 93 for supporting stockpiling conveyor 22 when in a fully retracted position.

Engine compartment 24 is mounted on the front portion 28 of chassis 12 and houses the power or control unit for trommel 10. Hydraulic motors for trommel 10 and the conveyor belts are conventional and are connected via hydraulic lines to the control unit and a hydraulic pump within the control unit. The required power can be provided by, for example, any available liquid cooled diesel engine. Engine compartment 24 also includes a hydraulic tank and other standard elements of a hydraulic system to feed the hydraulic pump. Hydraulic power is controlled by hand controlled valves and hose lines to adjust the rotating speed of rotary trommel cylinder 16, the speed of input conveyor 18, fines conveyor 20, and stockpiling conveyor 22. All hand control valves are accessible by an operator from ground level. All valves having definite positioning have detents to keep the drive in the desired mode. For servicing, all hydraulic flows from the oil reservoir can be shut off to any circuit by means of gate valves at the exit point from the reservoir. All valves have a built-in adjustable pressure relief device. The control unit may also have remote control means, such as conventional radio control equipment, so that an individual operating the loading equipment may be able to instantaneously control the apparatus, adjust the rotation speed of the trommel screen cage for optimal screening effect, adjust the speed of input conveyor 18, fines conveyor 20, or stockpiling conveyor 22, and adjust the radial position of stockpiling conveyor 22, for example.

Trommel 10 may also comprise a rejected material conveyor 130. Rejected material conveyor 130 enables coarse or rejected material to be discharged into a vehicle for transportation, or collected in a stockpile on the ground before the material is to be moved. Rejected material conveyor 130 is pivotally mounted to chassis 12 adjacent the outlet end of rotary trommel cylinder 16. Rejected material conveyor 130 comprises a lower part 131 and an upper part 132, pivotally connected together, with lower part 131 pivotally attached to chassis 12. Chains 133 extend between supporting lugs [not shown], which extend out from a junction between the lower and upper parts 131, 132 of rejected material conveyor 130. The upper ends of chains 133 are attached to upper ends of vertical frame members 136. To guide rejected or coarse material from rotary trommel cylinder 16 onto rejected material conveyor 130, a chute assembly comprising an upper chute [not shown] and a lower chute 140 is provided.

Rejected material conveyor 130 may also be adapted to rotate about a horizontal axis, and to fold or collapse for transportation. For example, to move rejected material conveyor 130 between extended and retracted positions, a first pair of hydraulic piston and cylinder assemblies 142 may be provided as an actuation means to fold the upper part 132 relative to the lower part 131 of rejected material conveyor 130. In order to fold rejected material conveyor 130 in its entirety relative to chassis 12, a second pair of hydraulic piston cylinders 144 are provided as an actuation means.

Figure 2A:
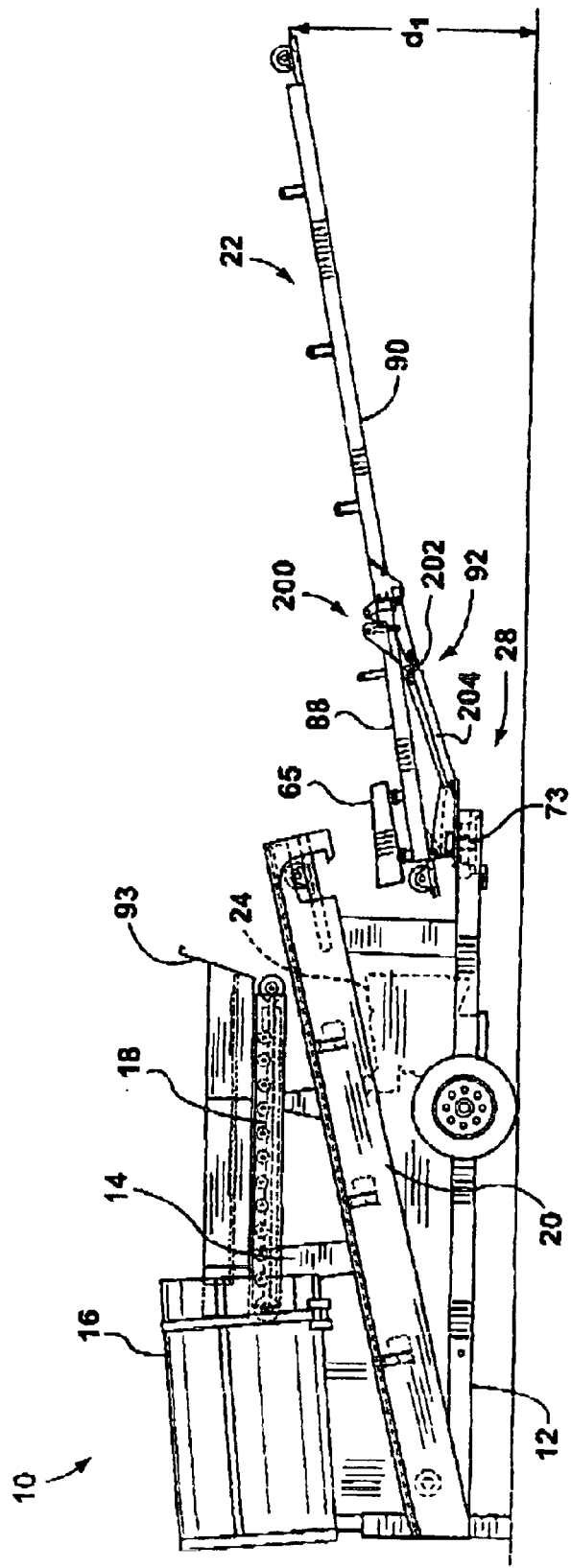
FIG. 2A is a partial side view of a portable trommel in an embodiment of the present invention in which the parts of a stockpiling conveyor are in a lowered, operational position.
Figure 2B:
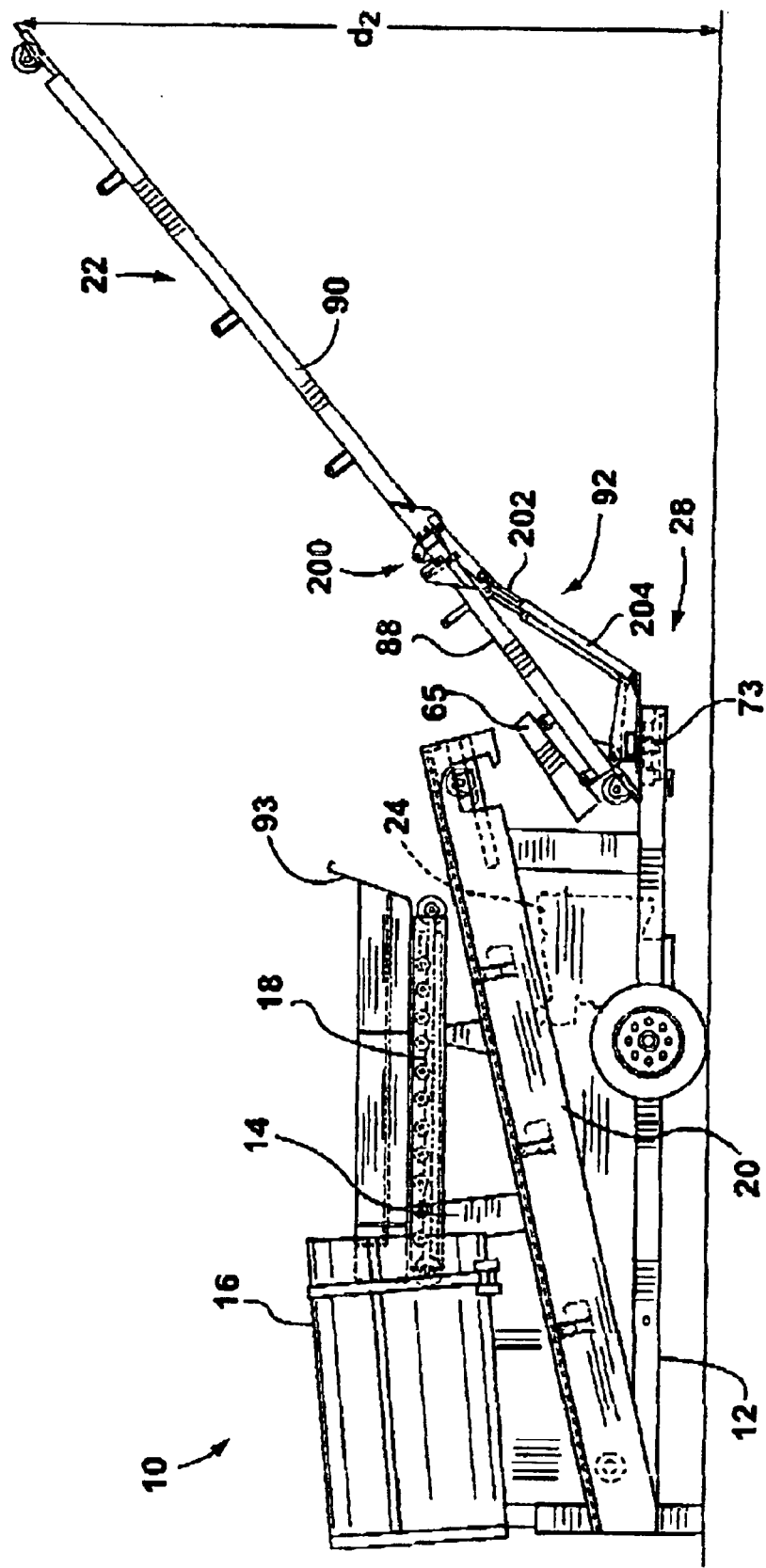
FIG. 2B is a partial side view of a portable trommel in an embodiment of the present invention in which the parts of a stockpiling conveyor are in a raised, operational position.
Figure 2C:
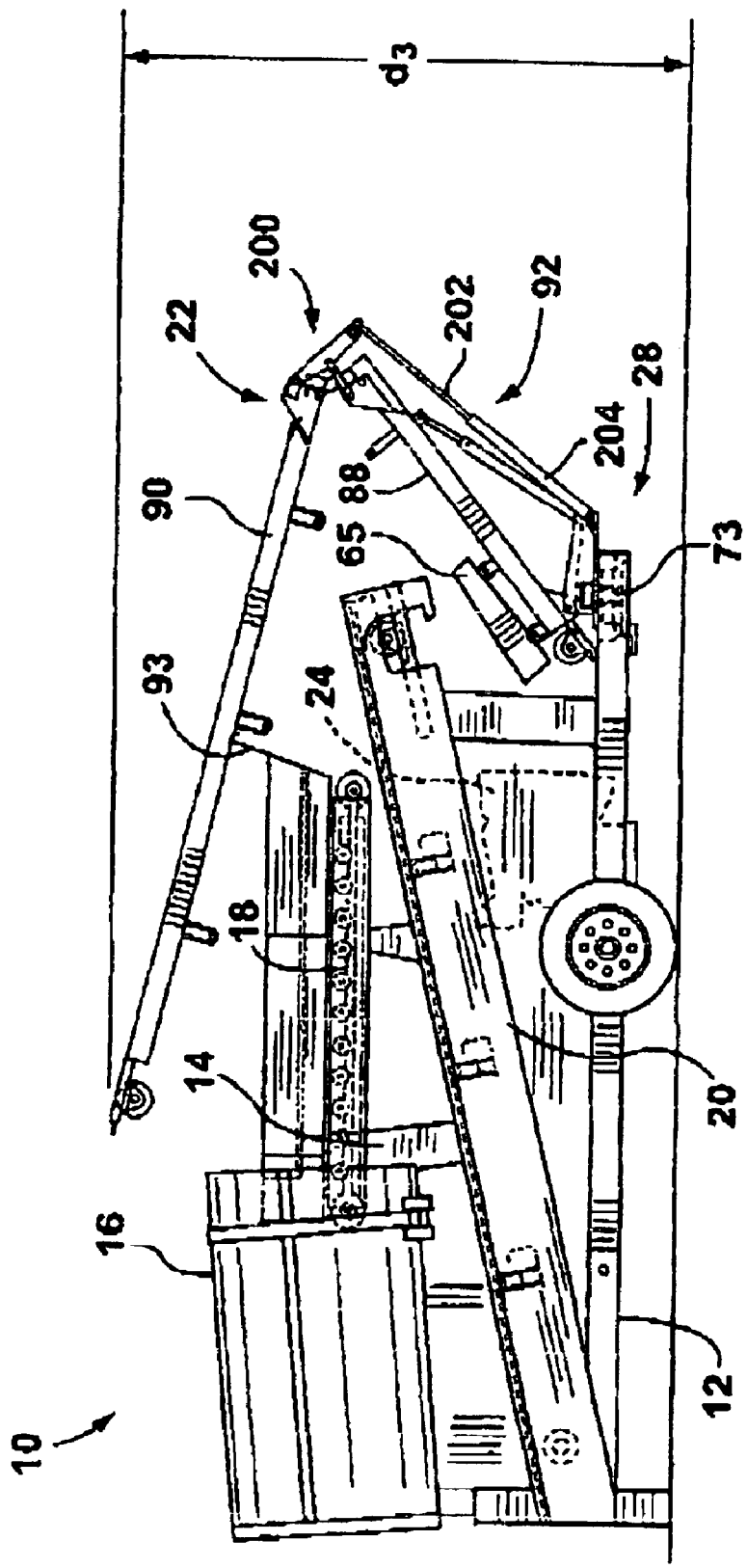
FIG. 2C is a partial side view of a portable trommel in an embodiment of the present invention in which the parts of a stockpiling conveyor are in a folded, retracted position.

Referring to FIGS. 2A through 2C, a partial side view of portable trommel 10 in an embodiment of the present invention is illustrated, in which the parts of a stockpiling conveyor 22 are shown in: (a) a lowered, operational position; (b) a raised, operational position; and (c) a folded, retracted position, respectively.

In accordance with the present invention, hydraulic ram assembly 92 controls the movement of a number of parts of stockpiling conveyor 22. In this embodiment of the invention, hydraulic ram assembly 92 comprises a single hydraulic ram pivotally coupled at one end to chassis 12 of trommel 10, and pivotally coupled at the other end to at least one of a number of mechanical linkages 200. The set of mechanical linkages 200 is configured to link the hydraulic ram assembly 92 and the lower and upper parts 88, 90 of stockpiling conveyor 22. The hydraulic ram assembly 92 and mechanical linkages 200 co-operate to move these parts of stockpiling conveyor 22 into a number of positions.

In FIG. 2A, a piston rod 202 of the hydraulic ram is shown attached to the mechanical linkages 200 while completely retracted within a hydraulic ram cylinder 204. In this state, the lower and upper parts 88, 90 of stockpiling conveyor 22 lie on substantially the same plane at a low incline relative to the ground, and may be considered to be in a lowered, extended, operational position. In this extended position, stockpiling conveyor 22 can operate to deposit material received from fines conveyor 20 to form a stockpile on the ground. The maximum height of such a stockpile, however, will depend on the height $d_1$ of the end of stockpiling conveyor 22 where material is discharged above the ground, when stockpiling conveyor 22 is in this lowered position.

In FIG. 2B, piston rod 202 is shown further extended from hydraulic ram cylinder 204 when compared to its position in FIG. 2A. In this state, the lower and upper parts 88, 90 of stockpiling conveyor 22 still lie on substantially the same plane, but together are positioned at a higher incline relative to the ground, and may be considered to be in a raised, extended, operational position. In this extended position, stockpiling conveyor 22 can still operate to deposit material received from fines conveyor 20 to form a stockpile on the ground. The maximum height of such a stockpile, however, will depend on the height $d_2$ of the end of stockpiling conveyor 22 where material is discharged above the ground, when stockpiling conveyor 22 is in this raised position.

The parts of stockpiling conveyor 22 may be moved into multiple raised positions, allowing stockpiles of varying heights can be formed. Generally, the further piston rod 202 is permitted to extend from hydraulic ram cylinder 204, the higher the extended stockpiling conveyor 22 will be raised. The maximum height that the stockpiling conveyor 22 can be raised will typically depend on the size and length of the piston rod 202 and hydraulic ram cylinder 204 of hydraulic ram assembly 92. There may also be a point where material can no longer be transported up the belt of stockpiling conveyor 22 given the incline of stockpiling conveyor 22, which practically, may also be a factor in determining the maximum height that the stockpiling conveyor 22 might be raised. In order to maintain the lower and upper parts 88, 90 of stockpiling conveyor 22 in an extended position, the appropriate mechanical linkages 200 are pinned (or otherwise locked in position) in order to prevent these parts from folding relative to each other, as will be explained in further detail below with respect to FIGS. 3A through 3C.

In FIG. 2C, piston rod 202 is shown even further extended from hydraulic ram cylinder 204 when compared to its position in FIG. 2B. However, the specific mechanical linkages 200 that were pinned to prevent the lower and upper parts 88, 90 of stockpiling conveyor 22 from folding are unlocked and made free to move. Instead, means to lock lower part 88 of stockpiling conveyor 22 into a selected position and prevent lower part 88 from being further raised while the upper part 90 is being folded relative thereto have been employed, as will be explained in further detail below with respect to FIGS. 3A through 3C. Accordingly, the further extension of piston rod 202 from hydraulic ram cylinder 204 causes the upper part 90 to fold with respect to the lower part 88 of stockpiling conveyor 22. In this state, the lower and upper parts 88, 90 of stockpiling conveyor 22 may be considered to be in a folded, retracted position, that may be suitable for the transportation of trommel 10.

The parts of stockpiling conveyor 22 may be moved into multiple folded positions; the further piston rod 202 extends from hydraulic ram cylinder 204 (with lower part 88 of stockpiling conveyor 22 locked in a selected position), the further upper part 90 of stockpiling conveyor 22 will be folded over lower part 88. Typically, it will be desirable to maximize the degree to which those parts of stockpiling conveyor 22 are folded (i.e. to minimize the effective height $d_3$ of stockpiling conveyor 22 when folded) before trommel 10 is moved for transport. The extent to which the parts of stockpiling conveyor 22 will be folded will depend on the distance that piston rod 202 is able to extend from hydraulic ram cylinder 204, and any part(s) of trommel 10 or that are attached to trommel 10 (e.g. support structure 93) that may prevent further folding.

Figure 3A:
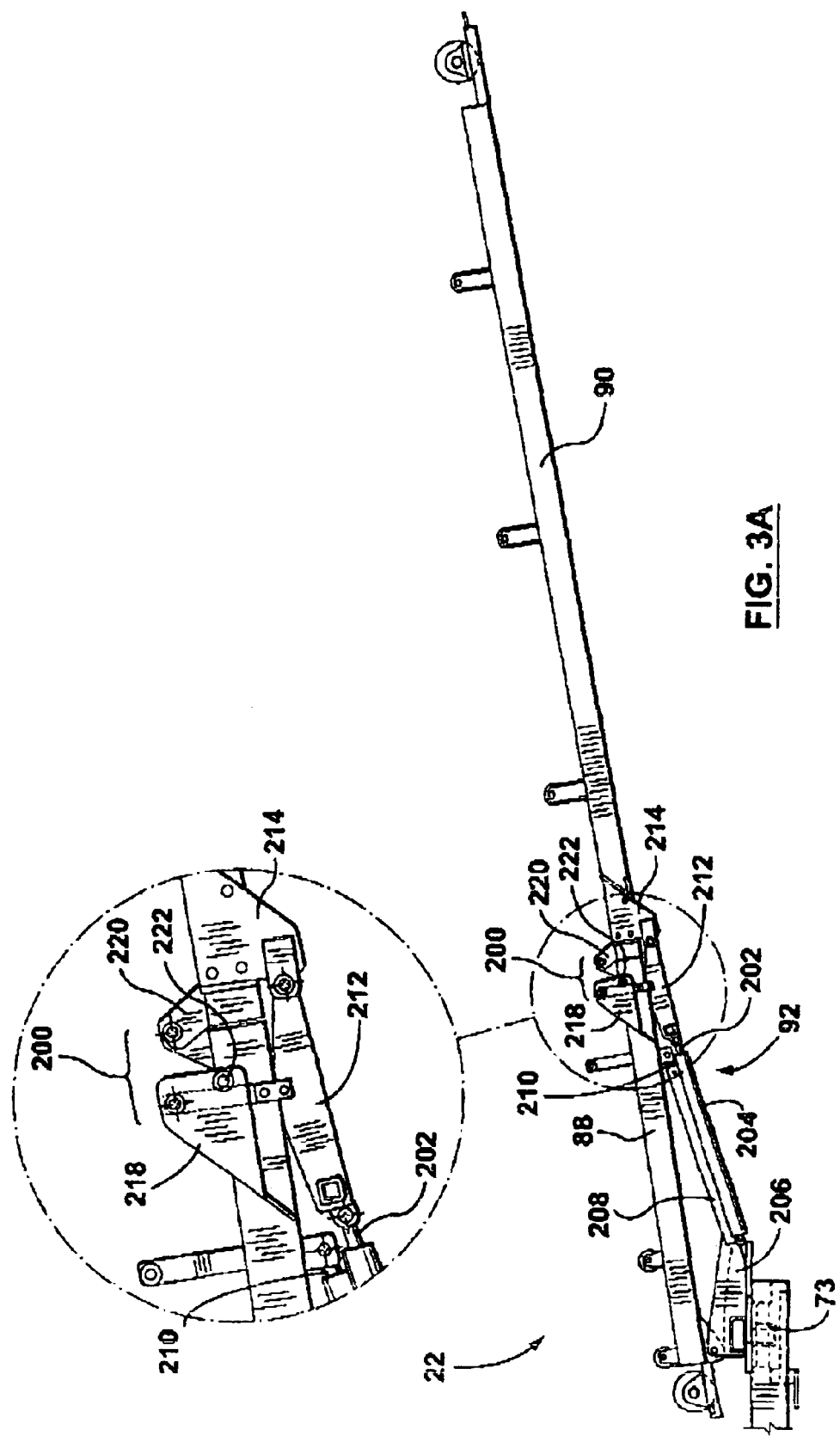
FIG. 3A is a side view of the stockpiling conveyor shown in FIG. 2A.
Figure 3B:
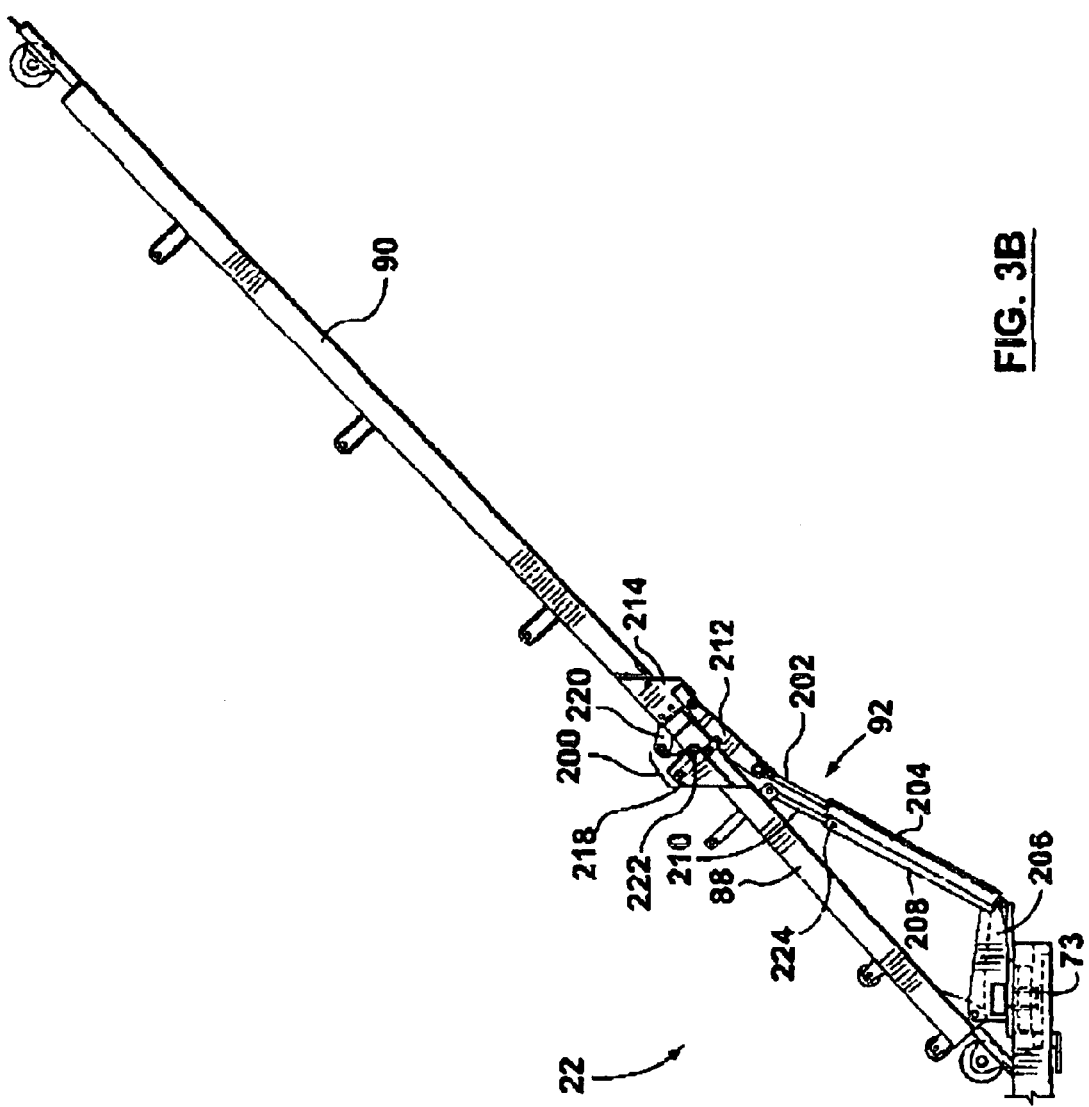
FIG. 3B is a side view of the stockpiling conveyor shown in FIG. 2B.
Figure 3C:
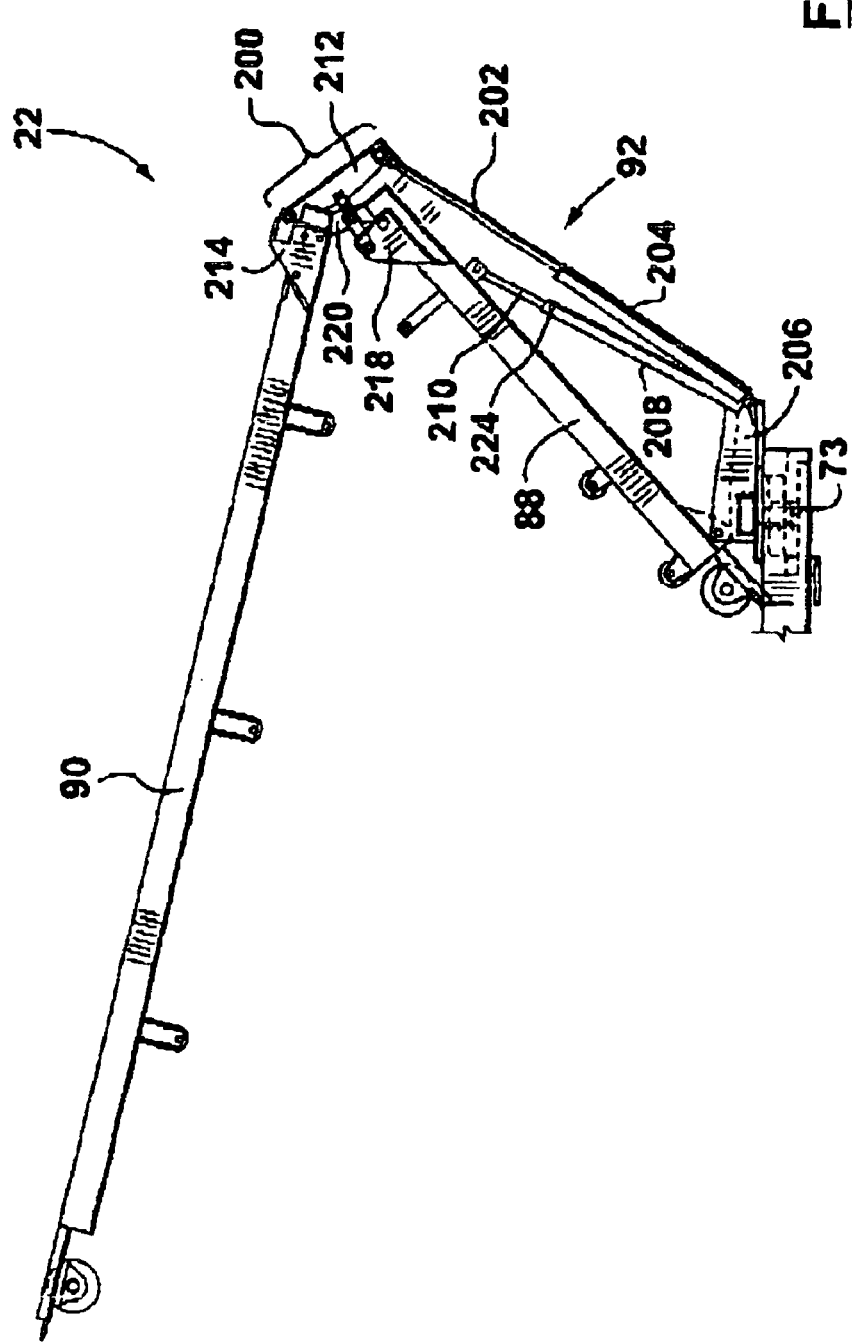
FIG. 3C is a side view of the stockpiling conveyor shown in FIG. 2C.

Referring to FIGS. 3A, 3B and 3C, side views of the stockpiling conveyor 22 as shown in FIGS. 2A, 2B and 2C respectively are illustrated. Hydraulic ram cylinder 204 is coupled at one end to chassis 12 (FIG. 1) of trommel 10 (FIG. 1) via a base member 206 fixed to rotation actuation means 73 of trommel 10. Hydraulic ram cylinder 204 is pivotally attached to base member 206 at one end to allow for rotation about a horizontal axis (i.e. the other end of hydraulic ram cylinder 204 can be raised or lower with respect to the ground). Lower part 88 of stockpiling conveyor 22 is also pivotally attached to base member 206 at its lowest end to allow for rotation about a horizontal axis.

Also pivotally attached to base member 206 is a support shaft 208. Support shaft 208 is pivotally attached to base member 206 at a first end, and is adapted to receive a support arm 210 at a second end. In one embodiment of the invention, support shaft 208 is hollow with a square cross-section, and includes an opening at the second end in which support arm 210 has been inserted. Support arm 210 is pivotally attached to lower part 88 of stockpiling conveyor 22 proximate to the end of lower part 88 where mechanical linkages 200 link the lower and upper parts 88, 90 of stockpiling conveyor 22.

In one embodiment of the invention, mechanical linkages 200 comprise a pair of T-shaped connection assemblies 212. Each T-shaped connection assembly 212 includes a first connection element that is pivotally connected to piston rod 202 at a first end, and that is pivotally connected to a respective one of a pair of upper flanges 214 that extends from and is fixed to upper part 90 of stockpiling conveyor 22 at a second end. Each T-shaped connection assembly 212 also includes a second connection element that is pivotally connected to a respective one of a pair of lower flanges 218 that extends from and is fixed to lower part 88 of stockpiling conveyor 22 at a first end, and that is pivotally connected at a second end to a respective first connection element at about the midpoint of the respective first connection element. The mechanical linkages 200 also comprise a pair of elbows 220, one on each side of stockpiling conveyor 22, linking lower part 88 and upper part 90 of stockpiling conveyor 22.

As shown in FIGS. 3A through 3C, hydraulic ram assembly 92 operates to raise stockpiling conveyor 22 between a lowered, extended, operational position (FIG. 3A), a raised, extended, operational position (FIG. 3B), and a folded, retracted position (FIG. 3C).

FIG. 3A illustrates stockpiling conveyor 22 in an initial, lowered position, in which the lower and upper parts 88, 90 of stockpiling conveyor 22 extend from chassis 12 (FIG. 1) and in which stockpiling conveyor 22 can be operated to form a stockpile of material received from fines conveyor 20 (FIG. 1). In this lowered position, piston rod 202 is fully retracted within hydraulic ram cylinder 204, and support arm 210 is fully retracted within support shaft 208.

In order to raise the height of stockpiling conveyor 22, the position of each connection assembly 212 is fixed with respect to its respective lower flange 218 of lower part 88 using a pair of first locking pins [not shown], each inserted (e.g. by an operator of trommel 10) into a respective one of a pair of first bores 222 that have been drilled into lower part 88 of stockpiling conveyor 22. When the first locking pins are inserted into their corresponding first bores 222, the first locking pins prevent movement of the connection elements of connection assemblies 212 in the direction in which the lower and upper parts 88, 90 of stockpiling conveyor 22 are extending in an operational position. In this embodiment of this invention, first bores 222 are positioned in the lower part 88 such that the first locking pins when inserted therein prevent movement of the connection elements of connection assemblies 212 without requiring first bores 222 to be drilled directly into a connection element of a connection assembly 212; however, in variant embodiments, first bores 222 may be provided directly on a connection element of a connection assembly 212 such that first locking pins directly secure connection assembly 212 to lower part 88 to prevent movement of connection assembly 212 relative to lower part 88.

In operation, hydraulic ram assembly 92 is activated to raise stockpiling conveyor 22 from the initial, lowered position, whereby piston rod 202 is driven to extend from hydraulic ram cylinder 204. Since support arm 210 is free to extend from support shaft 208, but each connection assembly 212 is neither free to move with respect to lower part 88 of stockpiling conveyor 22 nor free to pivot about lower flange 218, the connection assembly 212 (and other mechanical linkages 200) are forced to move away from hydraulic ram cylinder 204 of hydraulic ram assembly 92, i.e. the lower and upper parts 88, 90 are locked together. As piston rod 202 extends from hydraulic ram cylinder 204, stockpiling conveyor 22 is raised.

After stockpiling conveyor 22 reaches a desired, raised position, hydraulic ram assembly 92 is temporarily deactivated. Consequently, lower and upper parts 88, 90 of stockpiling conveyor 22 reach a position as shown in FIG. 3B. The desired position is determined by an operator. The operator may wish to maximize stockpile height, feed material into a truck or pickup of a given height, or keep the height of the stockpiling conveyor 22 low due to wind conditions, for example.

FIG. 3B illustrates stockpiling conveyor 22 in a raised position, in which the lower and upper parts 88, 90 of stockpiling conveyor 22 extend from chassis 12 (FIG. 1) and in which stockpiling conveyor 22 can be operated to form a larger stockpile of material received from fines conveyor 20 (FIG. 1). In this raised position, piston rod 202 is partially extended from hydraulic ram cylinder 204, and support arm 210 is partially extended from support shaft 208. For use in this position for any extended period of time, and for safety reasons, a second locking pin is inserted through the support shaft 208 and support arm 210. In known manner and as will be understood by those skilled in the art, the support shaft and arm 208, 210 will be provided with suitable apertures, and the hydraulic ram may need to be unbolted to obtain adequate alignment of selected apertures.

In order to fold the lower and upper parts 88, 90 of stockpiling conveyor 22 from this raised position, the connection elements of connection assemblies 212 are made free to move with respect to lower flange 218 of lower part 88, by removing first locking pins from their respective bores 222. Additionally, in order to prevent stockpiling conveyor 22 from being raised further while the lower and upper parts 88, 90 thereof are folding and otherwise to hold the lower part 88 in the selected position, at least one second locking pin is employed to lock support arm 210 within support shaft 208, as detailed above. In one embodiment of the invention, support shaft 208 provides at least one second bore 224 in which the second locking pin may be inserted. Support arm 210 also provides at least one corresponding bore which, when stockpiling conveyor 22 is in the raised position of FIG. 3B, lines up with the bore provided by support shaft 208 such that second locking pin 224 may be inserted through both bores to lock support arm 210 within support shaft 208. Preferably, the support shaft 208 is in the form of a tube, and at least one of the support shaft and arm 208, 210 provide a plurality of bores to enable a number of locking positions to be selected.

In operation, hydraulic ram assembly 92 is then re-activated, and piston rod 202 is driven to extend further from hydraulic ram cylinder 204. Since support arm 210 is locked within support shaft 208, but the connection elements of connection assemblies 212 are free to move with respect to lower part 88 of stockpiling conveyor 22 and to pivot about lower flanges 218, the connection assemblies 212 are forced to move away from hydraulic ram cylinder 204 of hydraulic ram assembly 92 as piston rod 202 extends from hydraulic ram cylinder 204, and the connection assemblies 212 pivots about lower flange 218. The first connection elements of the connection assemblies 212, being coupled to upper part 90 of stockpiling conveyor 22 at upper flange 214, force upper part 90 to pivot at elbows 220 with respect to lower part 88 and to fold over lower part 88 of stockpiling conveyor 22. Simultaneously, motion of the connection elements of the connection assemblies 212 is guided and controlled by the second connection elements thereof.

The hydraulic ram of hydraulic ram assembly 92 now uses the balance of its stroke (i.e. the extension of piston rod 202 from hydraulic ram cylinder 204) to fold the lower and upper parts 88, 90 of stockpiling conveyor 22 into a retracted position, suitable for transportation, as shown in FIG. 3C.

To move the lower and upper parts 88, 90 of stockpiling conveyor 22 from a folded, retracted position, to a raised, extended position, the operation described above with reference to FIGS. 2C and 3C is essentially reversed. Again, the support arm and shaft 208, 210 remain pinned and locked, while the connection assemblies 212 are free to move. Hydraulic ram assembly 92 is activated so as to cause piston rod 202 to partially retract within hydraulic ram cylinder 204. Upper part 90 unfolds with respect to lower part 88 until both parts reach the raised, extended position, as may be shown in FIGS. 2B and 3B. A stopper welded to the frame of stockpiling conveyor 22 may be used to aid in maintaining both parts in the raised, extended position. Hydraulic ram assembly 92 will be temporarily deactivated in order to maintain the lower and upper parts 88, 90 of stockpiling conveyor 22 in this raised, extended position.

To move the lower and upper parts 88, 90 of stockpiling conveyor 22 from a raised, extended position to a lowered, extended position, the operation described above with referenced to FIGS. 2B and 3B is essentially reversed. First, the connection assemblies 212 are pinned and locked using the first locking pins inserted in their respective first bores 222, to help maintain both parts of stockpiling conveyor 22 in an extended position. Then, to allow support arm 210 to retract within support shaft 208, the second locking pin is removed (e.g. by an operator of trommel 10) from its respective bore 224 in support arm 210 and corresponding bore in support shaft 208. If necessary, the hydraulic ram assembly 92 can be activated to take the load off the second locking pin. Hydraulic ram assembly 92 is then re-activated so as to cause piston rod 202 to further retract within hydraulic ram cylinder 204. As piston rod 202 retracts within hydraulic ram cylinder 204, support arm 210 retracts within support shaft 208 and the lower and upper parts 88, 90 of stockpiling conveyor 22 lower until both parts reach a lowered, extended position, as may be shown in FIGS. 2A and 3A. These parts of stockpiling conveyor 22 may be moved to a number of lowered, extended positions, but the lowest position that may be attained will typically depend on how far piston rod 202 may be retracted within hydraulic ram cylinder 204. Hydraulic ram assembly 92 will be temporarily deactivated in order to maintain the lower and upper parts 88, 90 of stockpiling conveyor 22 in the desired position.

It will be understood by persons skilled in the art that while the present invention may be described herein with references to pairs of various mechanical linkages that assist in the extending and folding of a conveyor, other implementations of the present invention in variant embodiments thereof may use more or less of such linkages, different configurations of mechanical linkages described herein, and/or different mechanical linkages, that would be sufficient to facilitate the extending and folding of the conveyor.

It will also be understood by persons skilled in the art that while the present invention has been described with reference to a conveyor that is also adapted to rotate about a vertical axis, conveyors that are incapable of rotating about a vertical axis or that are otherwise fixed to the chassis of a portable trommel may still be adapted to lower, be raised, or fold between extended and retracted positions in accordance with the present invention.

It will also be understood by persons skilled in the art that the present invention is not limited to conveyors considered to consist of only two parts that can fold into a retracted position. The mechanical linkages used may be adapted to permit conveyors having more than two parts that fold into a retracted position.

It will also be understood by persons skilled in the art that although the present invention has been described with respect embodiments in which the conveyor extends from an end of the chassis of a trommel, the conveyor may be recessed within the body of a trommel in variant embodiments of the invention, or may be attached to a side of the chassis, for example.

In variant embodiments of the invention, a conveyor and its associated hydraulic ram assembly may be oriented differently relative to the chassis or body of a trommel than has been illustrated herein. For example, the embodiment of the invention illustrated herein shows the upper part of a conveyor folding over at least a portion of the lower part in the folded position. However, the upper part may be displaced in alternative configurations relative to the lower part in variant embodiments (e.g. the upper part may fold under or beside the lower part, or at some other angle relative to the lower part). As a further example, in variant embodiments of the invention, after the parts of the conveyor are folded, they may together be rotated about an axis (e.g. a vertical axis), to allow the conveyor to be stored alongside the chassis of the trommel, for example. It will be understood by persons skilled in the art that certain variant configurations of the conveyor and hydraulic ram assembly may require the use of additional support structures or mechanical linkages as needed to support the conveyor in its extended and/or retracted positions.

Furthermore, while the present invention has been described with reference to the stockpiling conveyor of a portable trommel, it will be understood by persons skilled in the art that the present invention may also be adapted for implementation with respect to other conveyors (e.g. rejected material conveyor 130 of FIG. 1) where folding thereof may be desired In variant embodiments of the invention, different configurations of the hydraulic ram assembly may be used. For example, while the invention has been described with reference to a hydraulic ram assembly that comprises a single hydraulic ram, it will be understood by persons skilled in the art that a number of hydraulic cylinders, pistons, and attachments may be coupled together to collectively form a suitable hydraulic ram assembly.

In variant embodiments of the invention, the present invention may be applied to conveyors not only for trommels, but also for conveyors of other machines or vehicles such as screening plants, truck unloaders, or feeders/stackers, for example.

The present invention has been described with regard to specific embodiments. However, it will be understood by persons skilled in the art that a number of other variants and modifications can be made without departing from the scope of the invention defined in the claims appended hereto.

What is claimed is:

1. A portable trommel comprising:
   a) a chassis, including support wheels at one end thereof for movement of the portable trommel;
   b) a trommel rotatably mounted on the chassis and having an input end, an output end, and a trommel screen;
   c) input means for supplying material to be screened to the input end of the trommel, the input means being mounted on the chassis adjacent the input end of the trommel;
   d) output means for collecting material passing through the trommel screen, the output means being mounted on the chassis, below the trommel;
   e) a stockpiling conveyor mounted on the chassis and having a lower end for receiving screened material from the output means and having an upper end for discharging screened material to form a stockpile, wherein the stockpiling conveyor comprises a lower part pivotally attached to the chassis and an upper part pivotally attached to the lower part, the lower and upper parts being movable between an extended position in which the stockpiling conveyor extends upwardly and outwardly from the chassis, and a retracted position for transportation in which the lower part is at an angle to the upper part,
   f) one or more mechanical linkages connecting the lower and upper parts of the stockpiling conveyor;
   g) a first locking means to prevent relative movement between said lower and upper parts;
   h) a second locking means for locking the lower part of the stockpiling conveyor in a selected position; and
   i) a hydraulic ram assembly mounted between the chassis and said one or more mechanical linkages, wherein at least one of said one or more mechanical linkages is lockable using said first locking means such that activation of the hydraulic ram assembly displaces the lower and upper parts together, and wherein said at least one mechanical linkage is unlockable to permit relative movement between said lower and upper parts such that, with said lower part locked in said selected position by said second locking means, activation of the hydraulic ram assembly displaces the upper part of the stockpiling conveyor relative to the lower part.

2. The portable trommel of claim 1, wherein the hydraulic ram assembly consists of a single hydraulic ram comprising a hydraulic ram cylinder and a piston rod.

3. The portable trommel of claim 1, wherein the at least one mechanical linkage is locked by inserting at least one locking pin in a corresponding bore provided by the lower part.

4. The portable trommel of claim 1, wherein the upper part extends at least partially over the lower part when the upper and lower parts are in a retracted position.

5. The portable trommel of claim 1, wherein the lower part of the stockpiling conveyor has a lower end coupled to the chassis for rotation about a vertical axis.

6. The portable trommel of claim 5, wherein the lower end is coupled to the chassis for rotation about a vertical axis through a rotation actuation means.

7. The portable trommel of claim 6, wherein the rotation actuation means comprises a turntable mounted on the chassis, for rotation about a vertical axis, and wherein the lower part of the stockpiling conveyor is attached to the turntable.

8. A portable trommel comprising:
   a) a chassis, including support wheels at one end thereof for movement of the portable trommel;
   b) a trommel rotatably mounted on the chassis and having an input end, an output end, and a trommel screen;
   c) input means for supplying material to be screened to the input end of the trommel, the input means being mounted on the chassis adjacent the input end of the trommel;
   d) output means for collecting material passing through the trommel screen, the output means being mounted on the chassis, below the trommel;
   e) a stockpiling conveyor coupled to the chassis and having a lower end for receiving screened material from the output means and having an upper end for discharging screened material to form a stockpile;
   f) a rejected material conveyor coupled to the chassis and extending from the output end of the trommel for removal of course material that has traveled through the trommel, wherein the rejected material conveyor comprises a lower part pivotally attached to the chassis and an upper part pivotally attached to the lower part, the lower and upper parts being movable between an extended position in which the rejected material conveyor extends upwardly and outwardly from the chassis, and a retracted position for transportation in which the lower part is at an angle to the upper part;
   g) one or more mechanical linkages connecting the lower and upper parts of the rejected material conveyor;
   h) a first locking means to prevent relative movement between said lower and upper parts;
   i) a second locking means for locking the lower part of the rejected material conveyor in a selected position; and
   j) a hydraulic ram assembly mounted between the chassis and said one or more mechanical linkages, wherein at least one of said one or more mechanical linkages is lockable using said first locking means such that activation of the hydraulic ram assembly displaces the lower and upper parts together, and wherein said at least one mechanical linkage is unlockable to permit relative movement between said lower and upper parts such that, with said lower part locked in said selected position by said second locking means, activation of the hydraulic ram assembly displaces the upper part of the rejected material conveyor relative to the lower part.

9. The portable trommel of claim 8, wherein the hydraulic ram assembly consists of a single hydraulic ram comprising a hydraulic ram cylinder and a piston rod.

10. The portable trommel of claim 8, wherein the at least one linkage is locked by inserting at least one locking pin in a corresponding bore provided by the lower part.

11. The portable trommel of claim 8, wherein the upper part extends at least partially over the lower part when the upper and lower parts are in a retracted position.

12. The portable trommel of claim 8, wherein the lower part of the rejected material conveyor has a lower end coupled to the chassis for rotation about a vertical axis.

13. The portable trommel of claim 12, wherein the lower end is coupled to the chassis for rotation about a vertical axis through a rotation actuation means.

14. The portable trommel of claim 13, wherein the rotation actuation means comprises a turntable mounted on the chassis, for rotation about a vertical axis, and wherein the lower part of the rejected conveyor is attached to the turntable.

15. A conveyor, the conveyor having a lower end for receiving material to be conveyed and an upper end for discharging material to form a stockpile, wherein the conveyor comprises:

a) a lower part pivotally attached to a chassis;
  b) an upper part pivotally attached to the lower part, wherein the lower and upper parts are movable between an extended position in which the conveyor extends upwardly and outwardly from the chassis, and a retracted position for transportation in which the lower part is at an angle to the upper part;
  c) one or more mechanical linkages connecting the lower and upper parts of the conveyor;
  d) a first locking means to prevent relative movement between said lower and upper parts;
  e) a second locking means for locking the lower part of the conveyor in a selected position; and
  f) a hydraulic ram assembly mounted between the chassis and said one or more mechanical linkages, wherein at least one of said one or more mechanical linkages is lockable using said first locking means such that activation of the hydraulic ram assembly displaces the lower and upper parts together, and wherein said at least one mechanical linkage is unlockable to permit relative movement between said lower and upper parts such that, with said lower part locked in said selected position by said second locking means, activation of the hydraulic ram assembly displaces the upper part of the conveyor relative to the lower part.

* * * * *